(12) United States Patent
Armstrong et al.

(10) Patent No.: US 9,500,516 B2
(45) Date of Patent: Nov. 22, 2016

(54) RADIOMETERS FOR MEASURING CIRCUMSOLAR PROFILES

(71) Applicant: Masdar Institute of Science and Technology, Abu Dhabi (AE)

(72) Inventors: Peter Ross Armstrong, Abu Dhabi (AE); Ragini Kalapatapu, Hyderabad (IN); Matteo Chiesa, Trondheim (NO)

(73) Assignee: Masdar Institute of Science and Technology, Abu Dhabi (AE)

( * ) Notice: Subject to any disclaimer, the term of this patent is extended or adjusted under 35 U.S.C. 154(b) by 75 days.

(21) Appl. No.: 14/658,376

(22) Filed: Mar. 16, 2015

(65) Prior Publication Data

US 2015/0355018 A1   Dec. 10, 2015

Related U.S. Application Data

(63) Continuation of application No. 13/568,008, filed on Aug. 6, 2012, now Pat. No. 8,981,272.

(60) Provisional application No. 61/536,549, filed on Sep. 19, 2011, provisional application No. 61/515,232, filed on Aug. 4, 2011.

(51) Int. Cl.
| | |
|---|---|
| *G01J 1/02* | (2006.01) |
| *G01J 1/04* | (2006.01) |
| *G01J 1/42* | (2006.01) |
| *G01J 1/06* | (2006.01) |
| *G01W 1/10* | (2006.01) |

(52) U.S. Cl.
CPC ............ *G01J 1/0271* (2013.01); *G01J 1/0214* (2013.01); *G01J 1/0252* (2013.01); *G01J 1/0266* (2013.01); *G01J 1/0403* (2013.01); *G01J 1/0437* (2013.01); *G01J 1/0462* (2013.01); *G01J 1/06* (2013.01); *G01J 1/42* (2013.01); *G01W 1/10* (2013.01); *G01J 2001/4266* (2013.01)

(58) Field of Classification Search
CPC .... G01J 1/0214; G01J 1/0266; G01J 1/0271; G01J 1/0437; G01J 1/0462; G01J 1/06; G01J 1/42; G01J 1/04
USPC ................ 250/203.4, 239, 221, 216, 559.12; 342/351–355, 357.2
See application file for complete search history.

(56) References Cited

U.S. PATENT DOCUMENTS

| | | | |
|---|---|---|---|
| 4,430,000 A | 2/1984 | Eldering et al. | |
| 6,663,553 B2 | 12/2003 | Campbell et al. | |
| 6,849,842 B2 | 2/2005 | Little | |
| 8,520,221 B2 * | 8/2013 | Lohmann ............. | G01S 7/4813 356/614 |
| 8,981,272 B2 | 3/2015 | Armstrong et al. | |
| 2013/0118478 A1 | 5/2013 | Armstrong et al. | |

OTHER PUBLICATIONS

Buie, Optical considerations in solar concentrating systems. Thesis submitted to The University of Sydney for the degree of Doctor of Philosophy. Aug. 2, 2004. 175 pages.

(Continued)

*Primary Examiner* — Que T Le
(74) *Attorney, Agent, or Firm* — Wolf, Greenfield & Sacks, P.C.

(57) ABSTRACT

The invention in some aspects relates to radiometers and related methods of use. In some aspects of the invention, methods are provided for determining a circumsolar profiles at external locations of interest, e.g., at a solar power generation system installation site.

20 Claims, 5 Drawing Sheets

(56) References Cited

OTHER PUBLICATIONS

Harrison et al., Automated multifilter rotating shadow-band radiometer: an instrument for optical depth and radiation measurements. Applied Optics. Aug. 1, 1994;33(22):5118-5125.

Kalapatapu et al., Rotating shadowband for measuring sunshapes. Solar Paces 2011 Conference, Granada. Available Sep. 20, 2011. 8 pages.

Kalapatapu et al., Rotating Shadowband for the Measurement of Sunshape. Abstract for Solar Paces 2011 Conference, Granada. Available for download online Aug. 1, 2011. Conference held Sep. 20-23, 2011. 2 pages.

Michalsky et al., Improved broadband solar irradiance from the multi-filter rotating shadowband radiometer. Solar Energy. 2009;83:2144-56.

Muneer et al., A new method for correcting shadow band diffuse irradiance data. Transactions of the ASME. Feb. 2002;124:34-43.

Nakajima et al., Use of the sky brightness measurements from ground for remote sensing of particulate polydispersions. Applied Optics. May 20, 1996;35(15):2672-85.

Neumann et al., The influence of sunshape on the DLR solar furnace beam. Deutsches Zentrum fur Luft und Raumfahrt e.V. (DLR), Solare Energietechnik, D-51170 Koln, Germany. 1999. Solar Energy. 1999;66(6):447-57.

Wilbert et al., Circumsolar Radiation and Beam Irradiance Measurements for Focusing Collectors. ES1002 Workshop. May 22-23, 2012.

Wilbert et al., Measurement of Solar Radiance Profiles With the Sun and Aureole Measurement System. Sol. Energy Eng. Jun. 25, 2013. 135(4):041002-1-041002-11.

\* cited by examiner

FIG. 3
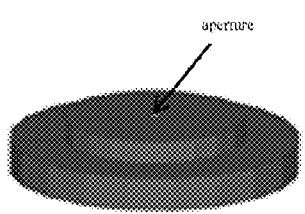 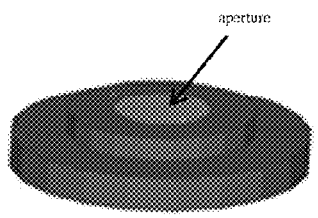 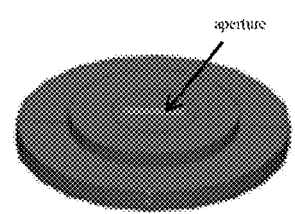
Light detector configured with a point aperture
Light detector configured with a circular aperture
Light detector configured with a slit aperture

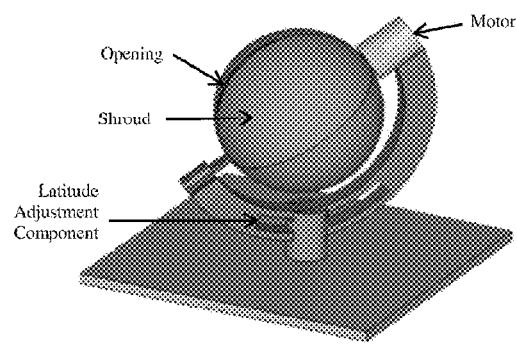
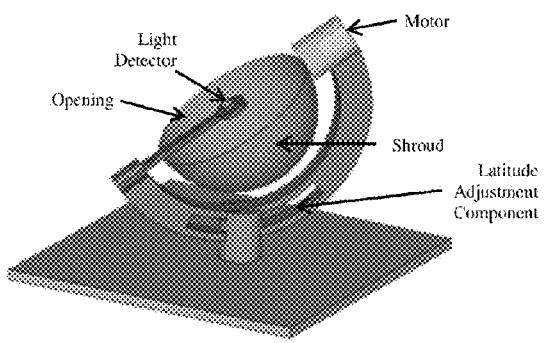
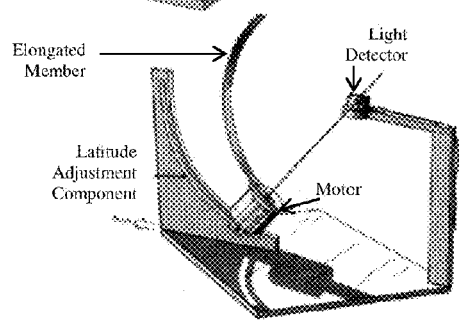
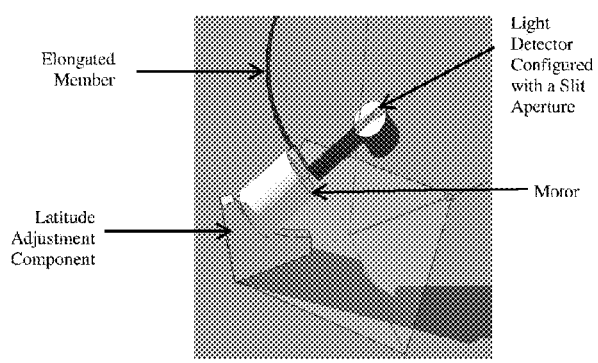

FIG. 5 - Shadowband
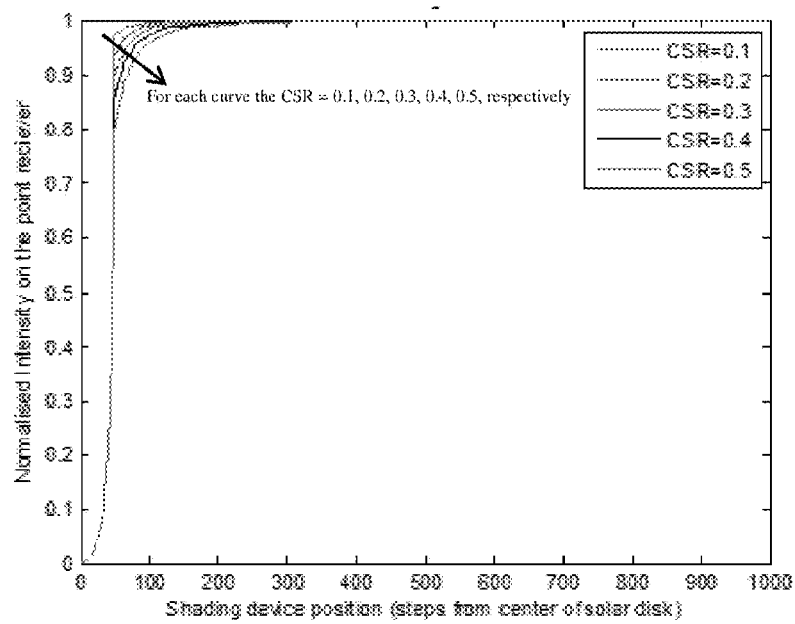
FIG. 6 – Slotted Globe
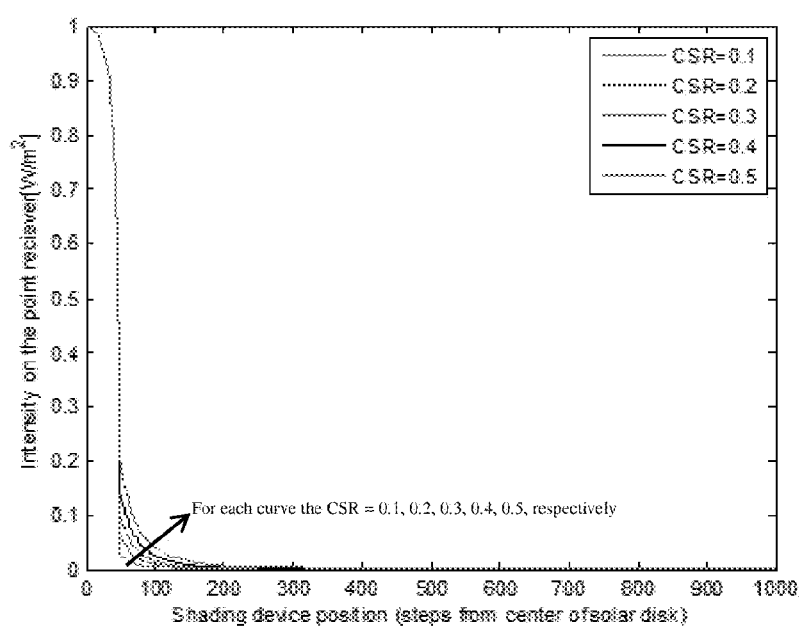

RADIOMETERS FOR MEASURING CIRCUMSOLAR PROFILES

RELATED APPLICATIONS

This application is a continuation application which claims the benefit under 35 U.S.C. §120 of U.S. application Ser. No. 13/568,008, entitled "RADIOMETERS FOR MEASURING CIRCUMSOLAR PROFILES" filed on Aug. 6, 2012, which claims priority under 35 U.S.C. §119(e) to U.S. Provisional Application Ser. No. 61/536,549, entitled "RADIOMETERS FOR MEASURING CIRCUMSOLAR PROFILES" filed on Sep. 19, 2011 and to U.S. Provisional Application Ser. No. 61/515,232, entitled "SUNSHAPE SHADOWBAND RADIOMETER" filed on Aug. 4, 2011, the contents of each of which are incorporated herein by reference in their entireties.

FIELD OF THE INVENTION

The invention generally relates to methods and apparatuses for measuring solar radiation.

BACKGROUND OF INVENTION

Economic losses due to overestimation of annual yields at solar power generation plant sites (e.g., concentrated solar power generation plant sites) is a significant concern for companies designing, planning and operating such plants. This overestimation of annual yields is normally based on radiation measurements obtained using traditional solar resource assessment instruments (e.g., pyrheliometers). While high-resolution long-term solar radiation measurements can give rise to better estimates of annual yields, they are expensive and labor intensive to obtain using current technology. Remote sensing methods are also incapable of measuring the angular distribution in the circumsolar region.

SUMMARY OF INVENTION

The invention in some embodiments relates to methods and apparatuses for establishing optical design parameters for solar power generation systems (e.g., concentrating solar power (CSP) systems). The invention in some embodiments relates to methods and apparatuses for establishing optical design parameters that impact the thermodynamic performance, and consequently the economic outcomes, of solar power generation systems (e.g., CSP systems). Certain embodiments of the invention relate to the recognition that solar power generation plants are sensitive to optical design parameters, such as concentration and acceptance angle, and that beam attenuation due to aerosols and the effect of varying sunshape profiles can be used to create accurate optical models that can take into account the specific solar resource conditions of a region. In some embodiments, the invention relates to small and low-cost field instruments for measuring circumsolar radiation profiles. In some embodiments, the instrument is referred to as a radiometer. In some embodiments, the instrument is referred to as a sunshape rotating shadowband radiometer. In some embodiments, the instrument measures circumsolar radiation profiles (e.g., hundreds of times in a day) automatically and unattended. In some embodiments, an instrument that measures circumsolar radiation profiles is referred to as a sunshape profiling radiometer, or is equivalently referred to as a sunshape profiling irradiometer. In some embodiments, a radiometer is useful for measuring flux (e.g., in units of W/st) from a portion of the sky, solar disk or circumsolar region. In some embodiments, an irradiometer is a device that measures flux (e.g., in units of $W/m^2$) incident on a light detector (which may also be referred to as a receiver) from a portion of the sky, sun, or circumsolar region. In some embodiments, a radiometer comprises an irradiometer (e.g., which comprises a fixed receiver/detector) and an occulting device (e.g., a band, half ellipsoid, full ellipsoid), which may be a single-axis-controlled occulting device.

In some embodiments, methods are provided for performing linear or nonlinear parameter estimation for determining circumsolar radiation profiles based on information obtained from the radiometer.

In some embodiments, information acquired from a radiometer is useful for producing a sunshape curve of a CSP installation site or of any other desired location. In some embodiments, information acquired from a radiometer is useful for producing a sunshape curve of a CSP installation site or of any other desired location automatically and unattended. In some embodiments, information acquired from a radiometer is useful for producing sunshape curves up to hundreds of times in a day. In some embodiments, radiometers disclosed herein may be used for solar resource assessment, climate research, to collect real-time data useful to derive global or regional weather forecasting models, or real-time data for control of CSP plants. In some embodiments, radiometers and related methods can be used to determine radial profiles of solar flux across the sun's disk and through the circumsolar region. In some embodiments, flux profiles, or sunshapes, can be used to infer absorption and scattering of solar radiation in the atmosphere, to estimate total aerosol column mass and size distribution, and/or to evaluate atmospheric radiation balance. It should be appreciated that unless otherwise indicated herein the term "solar radiation," as used herein, refers to solar radiation, circumsolar radiation and/or radiation from any part of the sky.

According to some embodiments of the invention, a radiometer is provided that comprises an opaque shroud (e.g., an ellipsoidal shroud) having an opening for admitting light (e.g., a slit). In some embodiments, the radiometer comprises a light detector disposed within the shroud; a motor configured for rotating the shroud about the light detector; and a controller operably coupled with the motor and configured for causing the motor to rotate the shroud about the light detector such that the opening for admitting light passes over the light detector. In some embodiments, the motor has a drive shaft coupled to a first end of the shroud. In some embodiments, the opaque shroud is a shading device that may block a certain amount of solar radiation and/or diffuse sky radiation (e.g., depending on the position and size of the shroud) from impinging on the light detector.

According to certain embodiments of the invention, a radiometer is provided that comprises a support structure having two confronting ends. In some embodiments, the radiometer comprises an opaque shroud having an opening for admitting light; a motor operably coupled to the first of the two confronting ends of the support structure, the motor being configured for rotating the shroud about a first axis passing through the two confronting ends; an elongated member having a first end connected to the second of the two confronting ends of the support structure and a second end disposed within the shroud; a light detector connected to the second end of the elongated member; and a controller operably connected with the motor and configured for controlling operation of the motor to rotate the shroud about the first axis from a first position, through a first angle (e.g., a predetermined angle), to a second position. In some embodiments, the light detector comprises a detection element that produces an output signal in response to light impinging on the detection element, in which the output signal represents the intensity of light impinging on the detection element.

In some embodiments, the radiometer further comprises a data acquisition system operably coupled to the light detector and configured for storing data representative of the intensity of light impinging on the detection element. In certain embodiments, the data acquisition system is configured for recording data representative of, indicative of, or derived as a function of the angle of rotation of the shroud about the light detector. In certain embodiments, the data acquisition system is configured for recording irradiation data, e.g., a detection signal of a radiometer. In some embodiments, the radiometer further comprises a data processing system configured for processing the light intensity data and data regarding the angle of rotation of the shroud to determine total sky radiation, $I_{sky}$, and/or direct radiation, $I_{direct}$, in which the direct radiation may be a combination of solar disk radiation and aureole radiation. In certain embodiments, the data processing system is further configured for determining the diffuse radiation, $I_{rsr}$, according to the equation: $I_{rsr}=I_{sky}-I_{direct}$. In certain embodiments, the data processing system is configured for determining the radial distribution of intensity in the circumsolar region using methods disclosed herein. In some embodiments, data processing (e.g., processing of light intensity data) is accomplished in whole or in part by post-processing. In certain embodiments, the radial distribution intensity in the circumsolar region is determined based at least in part on the diffuse radiation, $I_{rsr}$. In some embodiments, the data processing system is configured for determining sunshape parameters, κ, and, γ, which are related to the intensity of solar radiation, φ, impinging on the light detector and originating from the circumsolar region as a function of angular displacement, θ, of the shroud (from the center of the sun) about the light detector, according to the following equation: $\phi(\theta)=e^{\kappa}\theta^{\gamma}$. In some embodiments, the data processing system is configured for determining a circumsolar ratio In some embodiments, the circumsolar ratio (CSR) is determined by the following relationship:

$$CSR \approx \frac{\int_{\theta_S}^{\theta_{CS}} \phi(\theta) d\theta}{\int_0^{\theta_{CS}} \phi(\theta) d\theta},$$

where $\theta_S$ is the half angle subtended by the sun's disk, $\theta_{CS}$ is in a range of 2° to 10° (e.g., 2.5°).

In some embodiments of the invention, methods of operating a radiometer are provided. In some embodiments of the invention, methods are provided for determining a circumsolar profile at a desired external location, e.g., at a CSP installation site, meteorology station, climate research center. In some embodiments of the invention, methods of determining the circumsolar ratio at a desired external location are provided. In some embodiments, the circumsolar ratio and/or circumsolar profile are determined at multiple times per day, per week, per month, or per year to characterize temporal changes in sunshape at the desired external location. Such information may be useful for designing a solar power generation plant to be situated at the desired external location, or for deciding whether the desired external location is suitable for a solar power generation plant.

In some aspects of the invention, a radiometer is provided that comprises a light detector having an elongated region for detecting light; an opaque, elongated member configured for obstructing a light path to the light detector; a motor configured for rotating the elongated member about the light detector; and a controller operably coupled with the motor and configured for controlling operation of the motor to rotate the elongated member through a plurality of rotational positions about the light detector. In some embodiments, the controller is configured for controlling operation of the motor to rotate the elongated member such that at each rotational position the elongated member obstructs a different a light path to the light detector. In some embodiments, the controller is configured for controlling operation of the motor to rotate the elongated member such that at each rotational position the light detector is exposed to different portions of the sun, sky and/or circumsolar regions. In certain embodiments, the light detector of the radiometer comprises an aperture (e.g., an opening, a slit, an elliptical opening) configured for admitting light to the elongated region for detecting light. In some embodiments, the axis of rotation of the elongated member is coaxial (e.g., substantially coaxial) with the major axis of the elongated region of the light detector. In some embodiments, the major axis is the length of a rectangular elongated region. In some embodiments, the major axis is the major axis of an elliptical elongated region. In certain embodiments, the elongated member is a shadowband. In certain embodiments, the elongated member is curved (e.g., a curved flat band).

BRIEF DESCRIPTION OF DRAWINGS

FIG. 3. provides non-limiting examples of point, circular and slit receivers (detection elements);

FIG. 4A-D. provides non-limiting examples of a radiometer with a full globe shading device in FIG. 4A and a radiometer with a half globe shading device in FIG. 4B; exemplary shadowband radiometers are also shown in FIGS. 4C and 4D;

FIG. 5. provides a graph showing a simulated shadowband signal;

FIG. 6. provides a graph showing a simulated full globe signal;

DETAILED DESCRIPTION OF INVENTION

Figure 1:
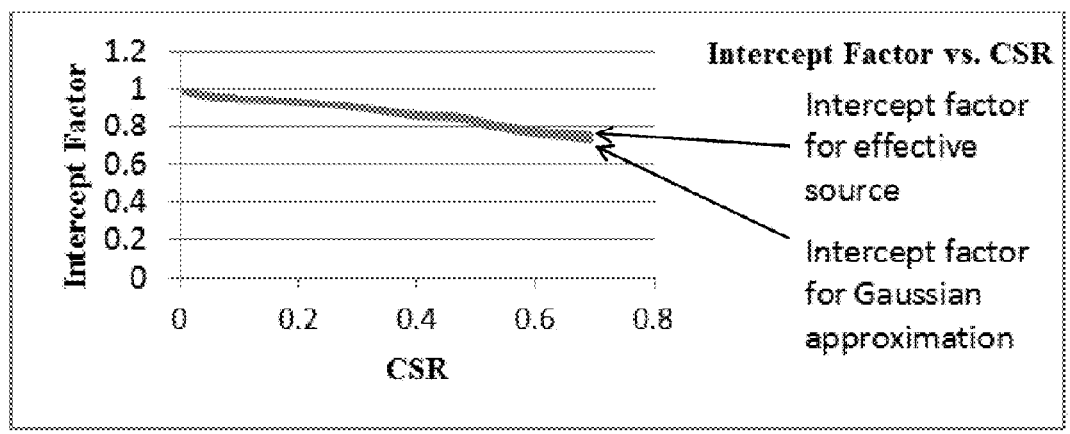
FIG. 1. provides a graph showing intercept factor vs. circumsolar ratio for Euro troughs.

Certain embodiments of the invention relate to the recognition that solar radiation incident on the earth's surface is not only due to the direct radiation from the solar disk but also from an aureole around the solar disk. Individual sunshapes are created by the small angle forward scattering of sunlight off aerosols in the troposphere. This sunshape has an influence on the performance of solar concentrating systems, particularly on high concentration facilities. Certain embodiments of the invention relate to small and low-cost field instruments for measuring sunshape profiles automatically and unattended. In some embodiments, instruments are provided that measure global diffuse and direct normal components of solar irradiance using a microprocessor based data acquisition system. In some embodiments, instruments are provided that measure direct normal components of solar irradiance from the solar disk and circumsolar region using a microprocessor based data acquisition system. In some embodiments, instruments are provided that measure direct normal components of solar irradiance from the circumsolar region using a microprocessor based data acquisition system. The instruments, in some embodiments, provide low-cost, reliable solution for routine use in solar resource assessment and atmospheric aerosol investigations.

Radiometers disclosed herein may comprise an opaque shroud having an opening for admitting light; a light detector disposed within the shroud; a motor configured for rotating the shroud about the light detector; and a controller operably coupled with the motor and configured for controlling operation of the motor to rotate the shroud about the light detector such that the opening for admitting light passes over the light detector. The radiometer may include a collimating device (e.g., a collimating box) configured and arranged to collimate solar radiation passing through the opening. In some embodiments, the collimating device is useful for absorbing stray light (e.g., solar radiation passing through the opening of a shroud outside of a plane defined by a light detector and the opening) that would otherwise reach the detector by internal reflection within the shroud. In some embodiments, the collimating device is useful for absorbing light outside of the region between the first and second meridians that bound the shroud's opening. The radiometers may be constructed of components made from materials having dimensional stability and weatherability. The shroud, for example, may be constructed of an aluminum material. In some embodiments, the radiometers include a latitude adjustment component, which may be a manual or automatic mechanism. In some embodiments, the radiometers include a manual latitude adjustment component. In some embodiments, the radiometers include an automated latitude adjustment component. In some embodiments, the radiometer comprises a latitude adjustment mechanism that uses one or more brackets for making latitude adjustments (e.g., 0° to 40°, 20° to 60° and 40° to 80° latitude adjustments). In some embodiments, suitable latitude adjustment components are known in the art and commercially available.

The shroud may be of an ellipsoidal shape (e.g., a spherical shape) that comprises an opening for admitting light. The opening may be relatively small, such as, for example, a slit. In configurations where the opening is a slit, the slit may extend from a position in relative proximity to the first end of the shroud to a position in relative proximity to the second end of the shroud (e.g., extending at least ±40° relative to the shroud's equator). In some configurations, the opening is relatively large (e.g., extending latitudinally for a distance of at least 60% of the total distance between the first and second ends of the shroud). The opening may extend latitudinally between the first and second ends of the shroud and longitudinally from a first meridian of the shroud, through an angle (e.g., a predetermined angle), to a second meridian of the shroud. The angle may be up to 180 degrees. The angle may be approximately 180 degrees. Accordingly, the opening may comprise half of the ellipsoidal (e.g., spherical, hemi-spherical) shape or more. The shroud may be an ellipsoidal shroud (e.g., an spherical shroud, globe-shaped, half globe-shaped) having a diameter in a range of 20 mm to 120 mm, 20 mm to 200 mm, 20 mm to 500 mm, 60 mm to 120 mm, 60 mm to 200 mm, 60 mm to 500 mm. In some embodiments, the shroud is an ellipsoidal shroud (e.g., a spherical shroud) having a major axis (e.g., a diameter) in a range of 20 mm to 120 mm, 20 mm to 200 mm, 20 mm to 500 mm, 60 mm to 120 mm, 60 mm to 200 mm, 60 mm to 500 mm. In some embodiments, the shroud has a major axis (e.g., a diameter) of approximately 100 mm. In some embodiments, the slit may be of any appropriate size and shape suitable for ensuring that light detector captures solar radiation (e.g., sky radiation, solar disk and aureole radiation). In some embodiments, the slit of the shroud is in a range of 5 mm to 10 mm long and 0.2 mm to 1 mm wide. In some embodiments, the slit of the shroud may be of any appropriate size and shape suitable for ensuring that light detector captures solar radiation (e.g., sky radiation, solar disk and aureole radiation) such that substantially all portions of the sun's circumsolar region are occluded at some point(s) as the shroud (shading device) makes a rotation (e.g., one complete rotation).

The motor of the radiometer, which may be a reversible motor, may be configured for rotating the shroud about the light detector. The motor of the radiometer may be a microstepper motor. The microstepper motor may be configured and arranged for generating 800 to 15,000 steps per revolution. For example, the microstepper motor may be configured and arranged for generating approximately 12,800 steps per revolution. The microstepper motor may be configured and arranged for generating approximately 1 to 10 steps per milliradian of rotation. The controller of the radiometer may be configured and arranged for causing the motor to rotate (e.g., reversibly rotate) the shroud about the first axis from a first position, through an angle, to a second position. The angle of motor rotation may be up to 360 degrees, up to 180 degrees, up to 90 degrees, up to 30 degrees, up to 20 degrees, or up to 10 degrees. In some embodiments, the radiometer includes a stepper motor that produces up to 0.9-degree steps and that drives a shading device about a polar axis. In some embodiments, the radiometer includes a stepper motor that produces up to 0.45-degree steps and that drives a shading device about a polar axis. In some embodiments, the radiometer includes a stepper motor that produces about 0.9-degree, 0.45-degree, 0.225-degree steps, 0.113-degree steps, 0.056-degree steps, or 0.028-degree steps. In some embodiments, the radiometer includes a vertical component that contains a latitude adjustment track (e.g., which may be oriented due north-south). In some embodiments, the radiometer is configured such that base and latitude adjustments may be made to orient the motor axis parallel to the rotation axis of the earth. In some embodiments, the radiometer is configured such that base and latitude adjustments may be made to orient the motor axis parallel to the rotation axis of the earth such that the shroud (shading device) rotates about a polar axis.

The light detector of the radiometer may comprise a detection element that produces an output signal in response to light impinging on the detection element, in which the output signal represents the intensity of light impinging on the detection element. The light detector (optical receiver) may be of any appropriate size and shape suitable for ensuring that it captures solar radiation (e.g., sky radiation, solar disk and aureole radiation). In some embodiments, the light detector is shaped as a slit, a rectangle, a square, a circle or other suitable shape. In some embodiments, the light detector comprises a detection surface shaped as a rectangle in a range of 5 to 10 mm long and 0.2 to 1.0 mm wide. The detection element may comprise a photovoltaic material or a thermoelectric material or a photo-resistive material, and may be configured with a diffusing foreoptic. In some configurations, multiple light detectors may be used. In some embodiments, the light detector responds to wavelengths between 300 and 1100 nm. In some embodiments, the light detector has a uniform spectral response. In some embodiments, the light detector does not have a uniform spectral response. In some embodiments, the light detector is temperature stabilized (e.g., stabilized near 40° C., 45° C., 50° C.). In some embodiments, the light detector is not temperature stabilized, and therefore, a temperature correction may be desirable.

A signal conditioner may be operably connected to the light detector for amplifying the output signal. In some embodiments, the light detector output is in the nano-amp to micro-amp range. In such embodiments, an amplifier (e.g., a chopper stabilized transconductance amplifier) may be used to amplify the signal (e.g., an LT-1050 amplifier). In some embodiments, on a given sweep of the radiometer, the maximum signal will be about 10,000× the minimum. In some embodiments, this wide range may be handled by auto-ranging the amplifier gain and/or by using a high resolution analog to digital (a/d) converter of 24 bits or more.

The radiometer may contain a data acquisition system operably coupled to the light detector and configured for storing data representative of the intensity of light impinging on the detection element. In some embodiments, the data acquisition system is configured for recording data representative of the angle of rotation of the shroud about the light detector. The radiometer may also contain a data processing system configured for processing the light intensity data and angle of rotation data to determine total sky radiation, $I_{sky}$, and/or direct radiation, $I_{direct}$, in which the direct radiation is a combination of solar disk radiation and aureole radiation. In some embodiments, the radiometer may contain a data processing system configured for processing the light intensity data and angle of rotation data, while controlling angle of rotation, to determine total sky radiation, $I_{sky}$, and/or direct radiation, $I_{direct}$, in which the direct radiation is a combination of solar disk radiation and aureole radiation. The data processing system may be configured for determining diffuse radiation, $I_{rsr}$, according to the equation: $I_{rsr}=I_{sky}-I_{direct}$. The data processing system may be configured for determining the radial distribution of intensity in the circumsolar region, which may be based at least in part on diffuse radiation, $I_{rsr}$. The data processing system may be configured for determining sunshape parameters, $\kappa$, and, $\gamma$, which are related to the intensity of solar radiation, $\phi$, impinging on the light detector and/or originating from the circumsolar region as a function of angular displacement, $\theta$, of the shroud (from the center of the sun) about the light detector, according to the following equation: $\phi(\theta)=e^{\kappa}\theta^{\gamma}$. The data processing system may be configured for determining a circumsolar ratio. In some embodiments, the circumsolar ratio (CSR) is determined by the following relationship:

$$CSR \approx \frac{\int_{\theta_S}^{\theta_{CS}} \phi(\theta)\, d\theta}{\int_0^{\theta_{CS}} \phi(\theta)\, d\theta},$$

where $\theta_S$ is the half angle subtended by the sun's disk, $\theta_{CS}$ is in a range of 2° to 10° (e.g., 2.5°).

The data acquisition system may be integrated with the controller, and/or the processing system. For example, a commercial data logger may be used that comprises a controller, data acquisition and data processing system. In some embodiments, the radiometer includes a data logger configured to perform one or more of the following: compute sun position, control the motor, control the detector temperature, read the detector signal(s), and accumulate data.

It should be appreciated that additional sensors may be included with the radiometer, e.g., thermometer, pressure gauge, etc. The choice of such additional sensors may depend on the application. In one configuration, sensors for determining temperature, relative humidity, dew point, wind speed and direction are also provided. Barometer data is also commonly taken. In addition, the temperature of the light detector may be controlled (e.g., to 50° C.) and/or monitored.

Methods of operating any of the radiometers disclosed herein are also provided. The methods may involve providing, obtaining and/or operating a radiometer disclosed herein. The methods may involve causing the opaque shroud of a radiometer to rotate about the light detector, under conditions in which solar radiation passes through the opening and impinges on the light detector; and determining the level of solar radiation incident on the light detector at one or more positions of rotation of the opaque shroud about the light detector. In configurations where the opaque shroud rotates about the light detector in a plurality of microsteps, the level of solar radiation incident on the light detector may be determined after one or more microsteps. The level of solar radiation incident on the light detector may also be determined continuously (e.g., at consecutive microsteps) during rotation of the opaque shroud about the light detector. The methods may also involve a step of determining a circumsolar ratio based on the level of solar radiation incident on the light detector at one or more positions (e.g., one or more microstep positions) of rotation of the opaque shroud about the light detector. The methods may involve determining sunshape parameters, $\kappa$, and, $\gamma$, which are related to the intensity of solar radiation, $\phi$, impinging on the light detector and/or originating from the circumsolar region as a function of angular displacement, $\theta$, of the shroud (from the center of the sun) about the light detector, according to the following equation: $\phi(\theta)=e^{\kappa}\theta^{\gamma}$. In some embodiments, the circumsolar ratio (CSR) is determined by the following relationship:

$$CSR \approx \frac{\int_{\theta_S}^{2.5°} \phi(\theta)\, d\theta}{\int_0^{2.5°} \phi(\theta)\, d\theta}.$$

In some embodiments of the invention, methods are provided for determining a circumsolar profile at a desired external location, e.g., at a CSP installation site. In certain embodiments, the methods may involve positioning a radiometer disclosed herein at the desired external location; using the radiometer to determine the diffuse radiation, $I_{rsr}$, at the desired external location; and determining the radial distribution of intensity in the circumsolar region (the circumsolar profile) based at least in part on the diffuse radiation, $I_{rsr}$. The radiometer may be configured for measuring circumsolar radiation profiles (e.g., hundreds of times in a day) automatically and unattended. The methods may involve performing linear or nonlinear parameter estimation for determining circumsolar radiation profiles based on information obtained from the radiometer. In some embodiments, view or shape factors specific to the receiver/detector and shading device geometries are utilized in order to determine a profile at each sweep of the circumsolar region or series of steps across the circumsolar region.

Methods for determining a circumsolar ratio at a desired external location are also provided. The methods may involve positioning a radiometer disclosed herein at the desired external location and causing the opaque shroud of the radiometer to rotate about the light detector, under conditions in which solar radiation passes through the opening and impinges upon the light detector. The methods may also involve determining the level of solar radiation incident on the light detector at one or more positions of rotation of the opaque shroud about the light detector. The method may also involve determining a circumsolar ratio based on the level of solar radiation incident on the light detector at one or more positions of rotation of the opaque shroud about the light detector.

As used herein, the terms "approximately" or "about" in reference to a number are generally taken to include numbers that fall within a range of 1%, 5%, 10%, 15%, or 20% in either direction (greater than or less than) of the number unless otherwise stated or otherwise evident from the context (except where such number would be less than 0% or exceed 100% of a possible value).

All references described herein are incorporated by reference for all purposes.

Exemplary embodiments of the invention will be described in more detail by the following examples. These embodiments are exemplary of the invention, which one skilled in the art will recognize is not limited to the exemplary embodiments.

EXAMPLES

An Instrument for Measurement of Sunshape Profiles

The solar radiation incident on the earth's surface is not only due to the direct radiation from the solar disk but also from an aureole around the solar disk. Individual sunshapes are created by the small angle forward scattering of sunlight off aerosols in the troposphere. In has been determined that this sunshape has an influence on the performance of solar concentrating systems, especially on high concentration facilities.

This example describes an instrument (a radiometer) for measurement of sunshape profiles. The instrument disclosed herein, by measuring the solar aureole, provides information on the small angle scattering. This instrument, which may be low-cost compared to typical conventional instruments for similar uses, was developed for continuous measurement of the radiance profiles coming from the circumsolar region. The circumsolar region is an area of enhanced sky brightness surrounding the solar disk due to the forward scattering of radiation caused by atmospheric aerosols and other constituents. The instrument described herein was developed in part for measuring the angular distribution of energy in this region. This angular distribution of energy may be referred to as a sunshape profile. The sunshape profile can play a role in determining the overall flux distribution in the focal plane of concentrating systems and hence the intercept factor of the receiver (see FIG. 1 and Table 1).

Certain radiometers disclosed herein may be used for one or more of solar resource assessment, climate research, or to collect real-time data useful to derive global or regional weather forecasting models at very low cost and can be made to measure the sunshape hundreds of times in a day. The instrument and analysis algorithm of certain embodiments together can retrieve the radial profile of solar flux across the sun's disk and through the circumsolar region. Flux profiles, or sunshapes, can be used to infer absorption and scattering of solar radiation in the atmosphere, to estimate total aerosol column mass and size distribution (especially when used in conjunction with multi-filter detectors), and to evaluate atmospheric radiation balance.

The radiometer may include an optical receiver (e.g., shaped as a slit), a shadowband drive (e.g., up to a 12,800-step per revolution shadowband drive), and a signal conditioner having up to a $10^6$-dynamic range. Effective resolution of, for example, 64,000 steps/revolution may be achieved by scanning the circumsolar region five times. Five sub-steps are created by the fact that the sun's position changes 360/64000 degrees every 13.5 seconds.

In an alternative configuration, the radiometer contains a micro-stepper motor that takes 3000 steps in a total of 20 degrees angle of the sun. Each milliradian is covered by 8 steps, taking 10 seconds to cover the solar disk and the aureole.

Sunshape Model

An empirical circumsolar brightness model (referred to as the Buie's model; D. C. Buie, (2004), "Optical Considerations in Solar Concentrating Systems", Ph.D. thesis, University of Sydney) was utilized in the context of certain embodiments of the invention. Buie's model is generally invariant to a change in location and dependent on one variable, the circumsolar ratio, ($\chi$). Over the two regions of the solar disk and the circumsolar aureole, the radial distribution of intensity ($\phi$) in the circumsolar region is defined using the following equations:

$$\phi(\theta)=\cos(0.326*\theta)/\cos(0.308*\theta), \{0<\theta<4.65 \text{ mrad}\}$$

$$\phi(\theta)=e^\kappa \theta^\gamma, \{\theta>4.65 \text{ mrad}\}$$

Where $\kappa=0.9 \ln(13.5\chi)\chi^{(-0.3)}, \gamma=2.2 \ln(0.52\chi)\chi^{(0.43)}-0.1$ $\kappa$ is a scaling factor determined by the intercept of the curve in log-log space, $\gamma$ is the slope of the curve. In this description, 4.65 mrad is an average over multiple seasons of the half angle of the solar disk. Exact values of the half angle of the solar disk may alternatively be used.

Figure 2:
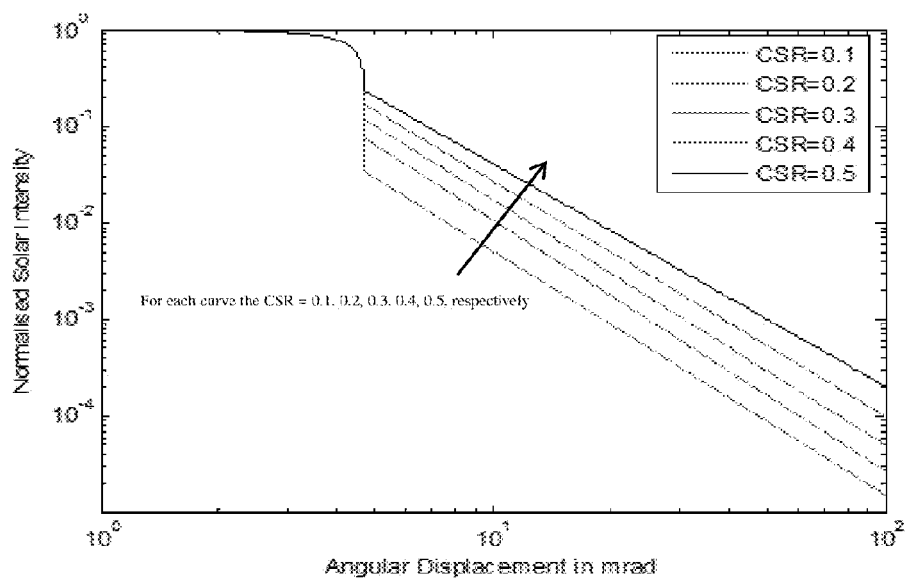
FIG. 2. provides a graph showing sunshape curves obtained from Buie's equations for circumsolar ratios (CSR's) from 0.1 to 0.5.

The linear relationship between the intensity of the circumsolar region to that of the radial distribution in log-log space is shown in FIG. 2 for different circumsolar ratios from 0.1 to 0.5.

Analysis

Three different kinds of the shading devices (globe, half globe, and shadowband—FIGS. 4A, 4B and 4C) and receivers (point, slit and circular—FIG. 3) were considered to assess the effect of shading and detector geometry on the sensitivity of sunshape retrieval:

A globe that shades the detector almost completely. The globe includes a slit parallel to the polar axis that allows or admits radiation from a portion of the sky or the solar disk, depending on the solar-slit hour angle, to reach the detector.

A half globe that blocks at least half the sky as the edge approaches and passes over the solar disk.

A shadowband (e.g., a 5° to 10° shadowband (e.g., a 6° shadowband)) that allows radiation from most of the sky to reach the detector The diffuse radiation on the shaded receiver is the difference of total sky radiation and the direct radiation from the disk and the aureole (with a correction for the part of the diffused sky, covered by the shadowband). Flux on a point receiver after being covered by the a shading device around the disk of the sun is given by:

$$I_{rsr} = I_{sky} - I_{direct}$$

For a receiver having finite area of A with shadowband and half globe shading device, the difference of uniform sky radiation and the direct radiation is convolved with the area of the slit. For example:

$$I_{rsr} = \int 2\pi G_Z \left\{ \int_0^{\frac{\pi}{2}} (\sin(\theta_Z)\cos(\theta_Z) + 1.68\sin(\theta_Z)\cos^2(\theta_Z))/2.68\, d(\theta_Z) \right\} - \phi(\theta) \right\} dA$$

Where $\theta_Z$ is Zenith angle, $G_Z$ is Zenith radiance, $\phi$ is the solar intensity of the disk and the circumsolar region with increasing angular displacement. The above equation divides the sky into two quadrants and is based on a sky clearness index of less than 0.2 (clear sky) and radiation distribution index of 1.68 for each hemisphere (See T. Muneer, and X. Zhang, "A new method for correcting shadowband diffuse irradiance data", ASME J of Solar Energy Engineering, 124 (2002), 34-43). Modeling of flux on the receiver results in the inverse of the sunshape curves as shown in FIG. 5.

In case of a full globe, during solar noon, the detector inside the sphere receives maximum signal from the solar disk when the slit is right on top of the receiver and then the intensity decreases as the slit rotates to shade the receiver. FIG. 6 shows the full globe simulation for different CSRs using Buie's model.

Inverse calculations are performed on the intensity signal (FIGS. 5 and 6) in order to retrieve or identify the sunshape profile through the use of slope ($\gamma$) and intercept ($\kappa$) values. These values are then compared with the sunshape model used in generating the intensity signal in the first place, according to the following relationships.

$$\kappa = 0.9 \ln(13.5\chi)\chi^{(-0.3)},$$

$$\gamma = 2.2 \ln(0.52\chi)\chi^{(0.43)} - 0.1$$

Alternatively, $\kappa$ and $\gamma$ may be determined without reference to $\chi$. And $\chi$ may be determined for any desired $\theta_{CS}$ using the following relationship:

$$\chi(\theta_{CS}) = \frac{\int_{\theta_S}^{\theta_{CS}} \phi(\kappa, \gamma, \theta)\, d\theta}{\int_0^{\theta_{CS}} \phi(\kappa, \gamma, \theta)\, d\theta},$$

where
$\theta_S$ is the half angle subtended by the sun, $\theta_{CS}$ is in a range of 2° to 10°, and $\phi(\kappa,\gamma,\theta)$ is determined by the following relationship:

$$\phi(\theta) = e^\kappa \theta^\gamma, \{\theta > 4.65 \text{ mrad}\}.$$

Note that $\theta_S$ is less than $\theta_{CS}$.

To assess the sensitivity of the retrieval or identification, the same analysis was performed after adding Gaussian noise to the shadowband intensity curve for $\chi=0.5$. In this analysis, as the shadowband moves over 200 steps, the receiver captures the sky radiation plus the disk and the aureole radiation, which in FIGS. 5-8 is normalized to 1.

Figure 7:
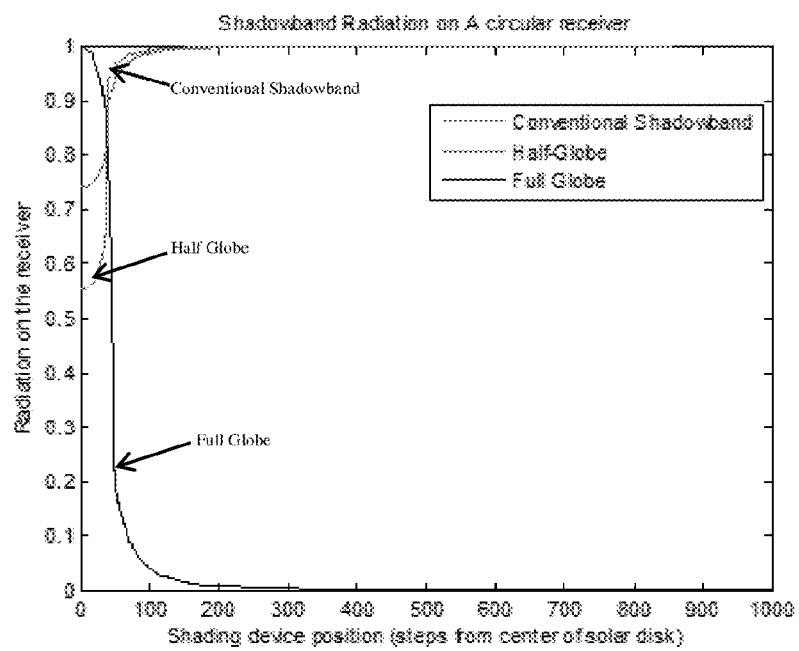
FIG. 7. provides a graph showing simulated radiation detection by three exemplary shading devices with a CSR of 0.5.
Figure 8:
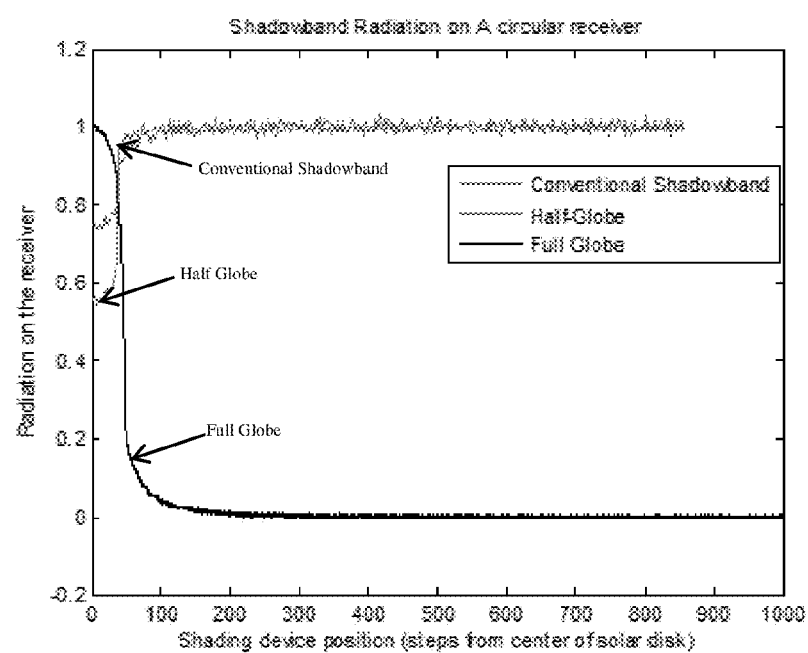
FIG. 8. provides a graph showing simulated radiation detection by three exemplary shading devices with signal to noise ratio (SNR) of 30 and CSR of 0.5.

FIGS. 7 and 8 correspond to a CSR of 0.5 for which $\kappa$ and $\gamma$ are 2.1158 and -2.2997 respectively using a finite circular receiver. For a point receiver, same values were obtained with inverse calculations of the slope and intercept from the generated curve of the shadowband for open, half and full globe models. In case of a circular receiver, there existed a deviation in the values of $\kappa$ and $\gamma$, by 0.0044 and -0.001 for regular shadowband and half globe shading device, 0.0024 and 0.0007 respectively for full globe.

Tables 2 and 3 show the inverse calculation results to obtain the values of $\kappa$ and $\gamma$ for all the three types of shading devices with point and circular receiver. Different signal to noise ratios were evaluated to check for the deviation of the results from the original values for all cases. The full globe design resulted in radial distribution estimates close to the true sunshape (Tables 2 and 3). Also, for a SNR of 100 the point receiver shows less deviation from original values in comparison with the circular receiver (Table 4). Hence, the sunshape plot can be obtained for a specific site with the obtained $\kappa$ and $\gamma$ from the intensity signal, which can be used for analyzing the forward scattering of aerosol particles and optical depth. Satellite based estimates of solar radiation can also be compared with this instrument.

The full globe shadowing both the sky hemispheres gives strong results that are close to the values of $\kappa$ and $\gamma$ from Buie's sunshape equations. A point receiver with a full globe band was a strong model. A optical receiver with a narrow slit may also be used, e.g., to obtain a larger signal without sacrificing retrieval accuracy observed with a circular receiver.

Tables for Example 1

TABLE 1

| Collector efficiency for Euro Troughs for different CSR's of the LBL sites | | |
|---|---|---|
| CSR | Collector Efficiency accounting for optical, surface and sunshape errors | Collector Efficiency accounting for Gaussian source with optical and surface errors |
| 0.0082 | 0.8426 | 0.8454 |
| 0.01 | 0.8394 | 0.8425 |
| 0.0270 | 0.8302 | 0.8398 |
| 0.0345 | 0.8266 | 0.8357 |
| 0.0571 | 0.8165 | 0.8241 |
| 0.0888 | 0.8149 | 0.8188 |
| 0.1061 | 0.8060 | 0.8102 |
| 0.1461 | 0.8040 | 0.8062 |
| 0.2042 | 0.7968 | 0.7963 |
| 0.2938 | 0.7778 | 0.7737 |
| 0.3990 | 0.7434 | 0.7329 |
| 0.4708 | 0.7324 | 0.7210 |
| 0.5260 | 0.6994 | 0.6847 |
| 0.5870 | 0.6748 | 0.6602 |
| 0.6920 | 0.6468 | 0.6387 |

TABLE 2

The deviation from original κ and γ for a point receiver at different Signal to Noise Ratios

| Signal to Noise Ratio | Parameters | Open Band | Half Globe | Full Globe |
|---|---|---|---|---|
| | | Deviation from original values | | |
| 65 | κ | 1.8121 | 1.1973 | −0.0164 |
| | γ | −0.5872 | −0.3835 | 0.0054 |
| 70 | κ | 0.8365 | 0.3999 | 0.0028 |
| | γ | −0.2627 | −0.1122 | −0.0008 |
| 80 | κ | −0.238 | −0.3 | 0.0021 |
| | γ | 0.079 | 0.1035 | −0.0007 |
| 90 | κ | −0.3837 | −0.0478 | 0.0004 |
| | γ | 0.1281 | 0.0162 | −0.0001 |
| 100 | κ | 0.0195 | 0.0039 | −0.0001 |
| | γ | 0.0037 | 0.0016 | 0 |
| 110 | κ | 0.0008 | 0.0006 | 0.0001 |
| | γ | −0.0026 | 0.0006 | 0.0001 |

TABLE 3

The deviation from original κ and γ for circular receiver at different Signal to Noise Ratios.

| Signal to Noise Ratio | Parameters | Open Band | Half Globe | Full Globe |
|---|---|---|---|---|
| | | Deviation from original values | | |
| 110 | κ | 2.0074 | 1.7947 | 1.1047 |
| | γ | −0.6447 | −0.5762 | 0.3421 |
| 115 | κ | 1.7855 | 1.3662 | 0.7645 |
| | γ | −0.5737 | −0.4377 | 0.2711 |
| 120 | κ | 1.1717 | 1.0476 | 0.5839 |
| | γ | −0.3743 | −0.3342 | −0.2645 |
| 130 | κ | 0.8444 | 0.7103 | 0.5538 |
| | γ | −0.2695 | −0.2265 | −0.1876 |
| 135 | κ | 0.6111 | 0.5296 | 0.4633 |
| | γ | −0.1945 | −0.1685 | −0.1450 |
| 140 | κ | 0.448 | 0.3383 | 0.1173 |
| | γ | −0.1424 | −0.1074 | −0.0982 |
| 145 | κ | 0.3323 | 0.3507 | 0.0574 |
| | γ | −0.1051 | −0.1113 | −0.0058 |
| 200 | κ | 0.0123 | −0.0053 | 0.0004 |
| | γ | −0.003 | −0.0026 | −0.0002 |

TABLE 4

Comparison between results of point receiver and circular receiver for the same SNR

| SNR | Parameter | Original values | Open Band | Half Globe | Full Globe |
|---|---|---|---|---|---|
| Point Receiver | | | | | |
| 100 | κ | 2.1158 | 2.1298 | 2.1198 | 2.1174 |
| | γ | −2.2997 | −2.3042 | −2.3011 | −2.3003 |
| Circular Receiver | | | | | |
| 100 | κ | 2.1158 | −0.0142 | 0.0114 | 0.2227 |
| | γ | −2.2997 | −1.6128 | −1.6231 | −1.6939 |

Example 2

Inverse Model

A model for the solar disk and the circumsolar region establish intensity profiles as a function of:
angular displacement (θ) and
sunshape parameters: slope and intercept (γ and κ)
FIG. 2 shows exemplary sunshape profiles that have been generated for different circumsolar ratios (0.1 to 0.5) using Buie's Equations.

Values of γ and κ can be obtained from an intensity signal obtained from a radiometer at a location of interest. With these values of γ and κ, the corresponding sunshape curve can be constructed in order to get the circumsolar ratio of the location of interest.

Methodology of the Inverse Model

Intensity falling on the receiver when it is shaded is the Diffused Radiation, which corresponds to Total Radiation−Direct Radiation.

This concept is set forth in the following equation:

$$I_{rsr} = I_{sky} - I_{direct}$$

The $I_{sky}$ contains the total sky radiation which may be determined from the equation (variables defined elsewhere herein):

$$I_{sky} = 2\pi G_Z \left\{ \int_0^{\frac{\pi}{2}} (\sin(\theta_Z)\cos(\theta_Z) + 1.68\sin(\theta_Z)\cos^2(\theta_Z))/2.68\, d(\theta_Z) \right\}$$

In the case of a full globe device that contains a slit for receiving solar radiation, and a receiver (light detector) inside the globe, the sky radiation is negligible, because radiation that enters the globe and impinges on the receiver is primarily from the solar disk and the circumsolar region. The sky radiation is blocked from both hemispheres and the small portion of sky radiation that may fall on the receiver may be neglected because the solar disk and circumsolar intensity is many times higher than the small portion of sky radiation falling into the slit. However, it should be appreciated that in some embodiments the sky radiation may be measured (and not neglected), for example, to obtain an estimate of diffuse radiation; to verify the presence of an approximately isotropic sky; and/or for diagnostic purposes.

For the half globe, only one hemisphere of the sky radiation is included in the equation.

For the full globe the following relationship exists:

$$I_{rsr} \approx \phi(\theta)$$

where φ is the solar intensity as a function of angular displacement (θ)

Exemplary $I_{rsr}$ signals for different circumsolar ratios (0.1 to 0.5) for a shadowband model and for a full globe model are shown in FIGS. 5 and 6, respectively. In the case of the shadowband, the shading device position at zero steps from the solar disk is such that the shadowband is positioned over the receiver (light detector) such that the shadowband is aligned with the rays from the center of the sun and with the center of the receiver. In the case of the full globe, the shading device position at zero steps from the solar disk is such that the slit of the globe is positioned over the receiver (light detector) such that the slit is aligned with the rays from the center of the sun and with the center of the receiver.

Plots for the $I_{rsr}$ as a function of the steps of rotation (angular displacement) taken by the shading device can be used for obtaining values of γ and κ from which the sunshape curves can be determined.

For the circumsolar region: $\phi(\theta) = e^{\kappa}\theta^{\gamma}$. Taking logarithm of both sides eliminates the exponential and the parameters γ and κ can be obtained inversely using regression. Alternatively, φ(θ) may be obtained using trial values of γ and κ.

Another method may be used for determining the parameters γ and κ which involves randomly generating a large number of curves (e.g., 1-10,000 curves) with different values of γ and κ. In this method, parameters γ and κ are determined to be those values of γ and κ that result in curves being closest to a simulated intensity curve.

Another method uses trial values of $\chi$ and the following relationships $$\kappa=0.9\ \ln(13.5\chi)\chi^{(-0.3)}, \gamma=2.2\ \ln(0.52\chi)\chi^{(0.43)}-0.1$$

to estimate $\chi$.

Example 3

Radiometer Operation

The following provides an exemplary process for operating a radiometer:
At time t, move shroud to east stop (e.g., approximately 5 to 10 degrees east of sun)
Initiate n sweeps of aureole every s seconds
  shading device will traverse quickly then return to east stop
Sample detector at each of m microsteps (e.g., m=200) to west stop (e.g., approximately 5 to 10 degrees west of sun)
Return to east stop
Next n
Return to home (nadir) position or other fixed position below the horizon.
Sample the detector after returning
Effective angular resolution may be evaluated according to the formula dm/n, where dm is microstep resolution of motor. The number of steps per sweep is expressed as (west stop−east stop)/dm, and the time between time between sweeps is s=24*3600*dm/n/360=240*dm/n. In this implementation, n may be user defined and may be set to produce the highest useful angular resolution. The selection involves considering trade-offs between sample size (which may lead to more accurate estimates of the circumsolar profile parameters) and positioning error (repeatability and linearity of the motor and shading device). In some implementations, a relatively short sweep time may be advantageous. Accordingly, it may be advantageous to impose a sweep time limitation on dm/n. In some cases, n is selected such that dm/n is approximately 0.01 degrees.

Example 4

Rotating Shadowband Irradiometer (RSI)

A stepper motor driven Rotating Shadowband Irradiometer (RSI) was developed, as depicted in FIG. 4D. The device employs a shadowband as a shading mechanism. The shadowband rotates about a polar axis on which a detector aperture is also disposed. The device utilizes an optical slit receiver with slit azimuth=0° and tilt equal to latitude of the location. The receiver aperture is situated on the band-motor (polar) axis. A Li-Cor PY-200 receiver/detector is modified by covering its circular diffusing aperture with a piece of black foil into which a very narrow rectangular slit is cut from the center on the axis line. Use of a slit sharpens the corners of the trough-like Sunshape Profiling Irradiometer (SPI) trajectory which in turn reduces sensitivity of the retrieved brightness distribution to noise and other measurement errors. Latitude adjustment of the instrument is made possible by placing the motor on an adjustable (0° to 65°) bracket such that receiver tilt equals site latitude. A single detector is used to generate the sunshape profiles. The circumsolar ratio (CSR) of the generated SPI trajectory may be estimated by finding the best match of the normalized measured profile to the family of simulated profiles, e.g., using Buie's model or the best match within a family of simulated profiles in which $\kappa$ and $\gamma$ are the intercept and slope of a linear log-log model.

While several embodiments of the invention have been described and illustrated herein, those of ordinary skill in the art will readily envision a variety of other means and structures for performing the functions and/or obtaining the results or advantages described herein, and each of such variations, modifications and improvements is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, provided that such features, systems, materials and/or methods are not mutually inconsistent, is included within the scope of the present invention.

In the claims (as well as in the specification), all transitional phrases or phrases of inclusion, such as "comprising," "including," "carrying," "having," "containing," "composed of," "made of," "formed of," "involving" and the like shall be interpreted to be open-ended, i.e. to mean "including but not limited to" and, therefore, encompassing the items listed thereafter and equivalents thereof as well as additional items. Only the transitional phrases or phrases of inclusion "consisting of" and "consisting essentially of" are to be interpreted as closed or semi-closed phrases, respectively. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood, unless otherwise indicated, to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements that the phrase "at least one" refers to, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Any terms as used herein related to shape, orientation, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, and/or geometric relationship include, but are not limited to terms descriptive of: shape—such as, round, square, circular/circle, rectangular/rectangle, triangular/triangle, cylindrical/cylinder, elliptical/ellipse, (n)polygonal/(n)polygon, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; direction—such as, north, south, east, west, toward the equator, facing the equator, etc.; surface and/or bulk material properties and/or spatial/temporal resolution and/or distribution—such as, smooth, reflective, transparent, clear, opaque, rigid, impermeable, uniform(ly), inert, non-wettable, insoluble, steady, invariant, constant, homogeneous, etc.; as well as many others that would be apparent to those skilled in the relevant arts. As one example, a fabricated article that would described herein as being "square" would not require such article to have faces or sides that are perfectly planar or linear and that intersect at angles of exactly 90 degrees (indeed, such an article can only exist as a mathematical abstraction), but rather, the shape of such article should be interpreted as approximating a "square," as defined mathematically, as an extent typically achievable and achieved for the recited fabrication technique as would be understood by those skilled in the art or as specifically described.

In cases where the present specification and a document incorporated by reference and/or referred to herein include conflicting disclosure, and/or inconsistent use of terminology, and/or the incorporated/referenced documents use or define terms differently than they are used or defined in the present specification, the present specification shall control. Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A radiometer comprising:
an opaque ellipsoidal shroud having an opening for admitting light;
a light detector disposed within the shroud;
a motor configured for rotating the shroud about the light detector; and
a controller operably coupled with the motor and configured for controlling operation of the motor to rotate the shroud about the light detector such that the opening for admitting light passes over the light detector.

2. The radiometer of claim 1, wherein the opening is a slit.

3. A radiometer comprising:
a support structure having two confronting ends;
an opaque shroud having an opening for admitting light;
a motor operably coupled to the first of the two confronting ends of the support structure, the motor configured for rotating the shroud about a first axis passing through the two confronting ends;
an elongated member having a first end connected to the second of the two confronting ends of the support structure and a second end disposed within the shroud;
a light detector connected to the second end of the elongated member; and
a controller operably connected with the motor and configured for controlling operation of the motor to rotate the shroud about the first axis from a first position, through a first angle, to a second position.

4. The radiometer of claim 1, wherein the motor has a drive shaft coupled to a first end of the shroud.

5. The radiometer of claim 3, wherein the elongated member extends through a bearing at a second end of the shroud.

6. The radiometer of claim 1 further comprising a collimating device configured and arranged to collimate solar radiation passing through the opening.

7. The radiometer of claim 1, wherein the shroud is an ellipsoidal shroud.

8. The radiometer of claim 1, wherein the shroud is a spherical shroud.

9. The radiometer of claim 1, wherein the opening is a slit extending from a position in relative proximity to the first end of the shroud to a position in relative proximity to the second end of the shroud.

10. The radiometer of claim 1, wherein the opening extends latitudinally between the first and second ends of the shroud and longitudinally from a first meridian of the shroud, through a second angle, to a second meridian of the shroud.

11. The radiometer of claim 10, wherein the second angle is up to 180 degrees.

12. The radiometer of claim 2, wherein the motor is a microstepper motor.

13. The radiometer of claim 1, wherein the motor is configured for reversibly rotating the shroud.

14. The radiometer of claim 3, wherein the first angle is up to 360 degrees.

15. The radiometer of claim 1, wherein the light detector comprises a detection element that produces an output signal in response to light impinging on the detection element, the output signal representing the intensity of light impinging on the detection element.

16. The radiometer of claim 15 further comprising a data processing system configured for processing the light intensity data and the angle of rotation data.

17. The radiometer of claim 16, wherein the data processing system is further configured for determining sunshape parameters, $\kappa$ and $\gamma$, which are related to the intensity of solar radiation, $\phi$, impinging on the light detector as a function of angular displacement, $\theta$, of the shroud about the light detector, according to the following equation:

$$\phi(\theta)=e^{\kappa}\theta^{\gamma}.$$

18. A method of operating a radiometer, the method comprising:
   causing the opaque shroud of a radiometer of claim 1 to rotate about the light detector, under conditions in which solar radiation passes through the opening and impinges on the light detector; and
   determining the level of solar radiation incident on the light detector at one or more positions of rotation of the opaque shroud about the light detector.

19. A method for determining a circumsolar ratio at a desired external location, the method comprising:
   positioning the radiometer of claim 1 at the desired external location;
   causing the opaque shroud to rotate about the light detector, under conditions in which solar radiation passes through the opening and impinges upon the light detector;
   determining the level of solar radiation incident on the light detector at one or more positions of rotation of the opaque shroud about the light detector; and
   determining a circumsolar ratio or sunshape parameters, $\kappa$ and $\gamma$ based on the level of solar radiation incident on the light detector at one or more positions of rotation of the opaque shroud about the light detector.

20. A method for determining a circumsolar profile at a desired external location, the method comprising:
   positioning the radiometer of claim 1 at the desired external location,
   using the radiometer to determine the diffuse radiation, $I_{rsr}$, at the desired external location; and
   determining the radial distribution of intensity in the circumsolar region based at least in part on the diffuse radiation, $I_{rsr}$.

* * * * *